(12) United States Patent
Turner et al.

(10) Patent No.: US 8,249,884 B2
(45) Date of Patent: Aug. 21, 2012

(54) METHODS AND SYSTEMS FOR IMPLEMENTING A LOYALTY PROGRAM UTILIZING CUSTOMIZABLE RULES

(75) Inventors: Kevin Turner, Round Rock, TX (US); Omar Besim Hakim, Austin, TX (US); Jeremy Kelley, Leander, TX (US); John Ludlow, Austin, TX (US)

(73) Assignee: Snoball, Inc., Austin, TX (US)

( * ) Notice: Subject to any disclaimer, the term of this patent is extended or adjusted under 35 U.S.C. 154(b) by 0 days.

(21) Appl. No.: 13/084,736

(22) Filed: Apr. 12, 2011

(65) Prior Publication Data
US 2012/0047009 A1    Feb. 23, 2012

Related U.S. Application Data

(60) Provisional application No. 61/401,667, filed on Aug. 18, 2010, provisional application No. 61/455,057, filed on Nov. 18, 2010.

(51) Int. Cl.
*G06Q 40/00* (2012.01)
(52) U.S. Cl. .................. 705/1; 705/14; 705/35
(58) Field of Classification Search ............ 705/14, 705/1, 35
See application file for complete search history.

(56) References Cited

U.S. PATENT DOCUMENTS

| | | | |
|---|---|---|---|
| 5,466,919 A | 11/1995 | Hovakimian | |
| 7,080,775 B2 | 7/2006 | Gorelick | |
| 7,571,849 B2 | 8/2009 | Burke | |
| 2002/0038225 A1* | 3/2002 | Klasky et al. | 705/1 |
| 2002/0099654 A1 | 7/2002 | Nair | |
| 2002/0120539 A1 | 8/2002 | Price | |
| 2002/0174063 A1 | 11/2002 | Major | |
| 2003/0167177 A1 | 9/2003 | Branch | |
| 2005/0004867 A1 | 1/2005 | Spector | |
| 2005/0021363 A1 | 1/2005 | Stimson | |
| 2005/0109840 A1* | 5/2005 | Walker et al. | 235/380 |
| 2005/0251485 A1 | 11/2005 | Quigley | |
| 2006/0122856 A1 | 6/2006 | Rushton et al. | |
| 2006/0122874 A1 | 6/2006 | Postrel | |
| 2006/0235713 A1 | 10/2006 | Tobler | |
| 2006/0253320 A1 | 11/2006 | Heywood | |

(Continued)

FOREIGN PATENT DOCUMENTS

WO    WO-2004034292 A1    4/2004

(Continued)

OTHER PUBLICATIONS

Social Media for a Social Cause. (Dec. 28, 2011). AllAfrica.com (French Ed.). Retrieved May 29, 2012.*

*Primary Examiner* — Kito R Robinson
(74) *Attorney, Agent, or Firm* — Stephen A. Mason; Meyertons, Hood, Kivlin, Kowert & Goetzel, P.C.

(57) ABSTRACT

A method and system for making a donation to a third party includes storing, via a storage device, a user preference in a user account; receiving, via a receiver, information regarding a purchase transaction at a merchant; accessing, via a processor, the user preference from the user account; dynamically selecting, via the processor, a percentage discount to be allocated to the purchase transaction; donating, via the processor, a monetary value of the percentage discount to the third-party according to the user preference, where the user account is associated with a user, and includes rules for allocating the percentage discount to the third-party.

18 Claims, 4 Drawing Sheets

U.S. PATENT DOCUMENTS

| | | |
|---|---|---|
| 2006/0253321 A1 | 11/2006 | Heywood |
| 2008/0109304 A1* | 5/2008 | Sarelson et al. ............... 705/14 |
| 2008/0162233 A1 | 7/2008 | Rothschild |
| 2008/0222029 A1 | 9/2008 | Poster |
| 2008/0281690 A1* | 11/2008 | Tietzen et al. ............... 705/14 |
| 2008/0313077 A1 | 12/2008 | Schropfer |
| 2010/0023341 A1* | 1/2010 | Ledbetter et al. ............... 705/1 |
| 2010/0049652 A1 | 2/2010 | Young |
| 2010/0088174 A1 | 4/2010 | Cohagan et al. |
| 2010/0191610 A1 | 7/2010 | Fields |
| 2010/0217613 A1 | 8/2010 | Kelly |

FOREIGN PATENT DOCUMENTS

| | | |
|---|---|---|
| WO | WO-2008092279 A1 | 8/2008 |

\* cited by examiner

METHODS AND SYSTEMS FOR IMPLEMENTING A LOYALTY PROGRAM UTILIZING CUSTOMIZABLE RULES

CROSS-REFERENCE TO RELATED APPLICATIONS

This non-provisional application claims the benefit of Provisional Application No. 61/401,667, filed Aug. 18, 2010, and the benefit of Provisional Application No. 61/455,057, filed Nov. 18, 2010, both of which are herein incorporated by reference in their entirety.

FIELD OF THE INVENTION

This invention relates to the field of charitable donations, and more particularly to methods and systems for implementing a charitable distribution program through customizable rules based on various criteria.

BACKGROUND OF THE INVENTION

Currently, people may donate goods or services to charities, however, traditional donations have been monetary distributions via a credit or debit card, cash or check. People may donate online, by phone, or by mail, and may also elect to have a certain amount deducted from their salary, checking account, or credit or debit cards at preset intervals. Alternatively, in lieu of obtaining frequent flier miles or other benefits, people might elect to use a store card, whereby a specific charity receives a monetary percentage for each purchase made by the person with the card, whereby the person foregoes the benefits received in miles or other rewards. In this case, the donation is made by the card company to the charity. In addition, if the person wishes to make donations to multiple charities, they would be required to use multiple cards, with each card tied to a specific charity.

There are many websites that make contributions to various charities by donating a percentage of the proceeds from purchased goods to either a charity selected by the vendor of the website, or by allowing a credit or debit card user to select one of several charities for donations to be made based upon their purchases. Further, some websites ask purchasers if they would like to make a donation to a particular charity for a preset amount. In these instances, the purchaser cannot dictate the terms of the charitable donations nor the charity to receive these donations.

Further, existing contribution programs that donate to non-profits as a percentage of a monetary transaction are often governed by rigid terms. These terms are often dictated by the issuer of the card, or by the participating merchant. Some are tied to one merchant, as a loyalty card, and usually allow donations to a single non-profit. For example, Kroger's Neighbor-to-Neighbor program allows a single non-profit to receive a percentage of a fixed sum based on sales transactions by a user. Still, others such as branded credit cards allow one to donate all transactions for the card to a single non-profit, such as a higher education organization, for example. In every case, the donation terms are largely dictated to the cardholder, rather than the reverse.

There is therefore a need for a system and method that overcomes some or all of the previously delineated drawbacks of prior loyalty programs, which provide for a loyalty program having customizable rules that incorporate the preferences of merchants, charities, individuals, or groups. There is also a need for a loyalty program that provides a system and method for dynamically determining the rules for distributing benefits to non-profits, as well as customizable rules that identify the events that trigger the gift-giving to at least one entity in the loyalty program.

SUMMARY OF THE INVENTION

The invention relates to a method and system for devising and operating a loyalty program having customizable rules where merchants, charities, individuals, or groups may enroll and participate in the loyalty program. In one embodiment, a customer may select his/her charity to be a recipient of the program, and participates with at least one merchant, affiliated with the loyalty program, to associate the charity to the loyalty program. The loyalty program may be implemented using various point of donation devices, such as wireless devices, scanners, smartphones, which utilize technologies such as, for example, iPhone applications, Android applications, other smart phone applications, card reader, a scanner, facebook integration and applications, other social networking applications, open authentication, authorize.net, key fobs, paper, bar codes, image codes, biometric readers including fingerprint or retinal scan readers, text messaging, Foursquare and other check-in engines, online widgets, iGoogle apps, Windows apps, Google Marketing place integration and apps, HTML5, web browsers and other similar types of applications. The use of these technologies enables the donor (or customer) to associate various devices to the dynamic discounts and coupons from a donor and vendor perspective. Upon arriving at a merchant's store or point of sale location, the customer would provide or transmit his user information, which is contained in a unique image or code via paper, readable card, mobile device, key fob, or other device, to the merchant. The merchant would collect or receive this information from the customer upon scanning or reading his paper, card, mobile device, or key fob. The customer may also elect to determine the discount amount of money given to the charity, with the merchant providing this discount either to the customer for transmitting the discount to the charity, as a percentage or fee back directly to the charity, or providing a percentage or fee to, in one example, the provider of the loyalty program. For the select merchants who wish to participate in the loyalty program, the customer may select to have their "discount" go to the charity instead of themselves through this dynamic coupon based upon an agreement by the merchant to compensate the customer. Through the loyalty program, the customer, at the point of sale, may select this discount amount and the destination where the discount should be sent. The dynamic coupon is flexible at the point of sale and may be adjusted by either the customer or the merchant to determine the discount level or the entities that are to receive the "discount." For online customers who may shop at the merchant's web site or mobile site, the customer would type in a code word, phrase, or scan image code during the sales or checkout process as determined by the merchant to avail themselves of the discount. The merchant would in turn compensate the customer with a discount, a percentage or fee back to the charity, and a percentage or fee to the provider of a loyalty program.

The invention provides a user to be in control of the donations made to the charity. This control may be provided through the ability to designate one or many non-profits at any given time to donate to, through the ability to apply "rules" that dictate how the giving is distributed, and through voluntary adding, by the user, fees to certain transactions based on rules. These rules include, but are not limited to specific merchants shopped, time/season/holiday, location, category of items purchased, and frequency of purchases, amount, giving limits, or social networking behavior.

In another embodiment of the invention, a consumer user would enroll in the loyalty program managed by a company and receive a card from a Financial Institution upon approval of the user's credit. Alternatively, the loyalty program may be administered through a gift card that does not require any credit approval to use. In one non-limiting embodiment, the user is registered in the loyalty program managed by a company upon card approval, with the registration and approval process being done by either a third party or the Financial Institution. Upon signing up for the loyalty program, the user may select one or multiple non-profits to receive a percentage of the fee. In another non-limiting embodiment, the user may not be required to sign up as the program defaults to a charity as designated by the loyalty program until changed by the user at a later time. The non-profits in the loyalty program may include, in some non-limiting embodiments, charities, churches, service organizations, educational organizations, political entity, religious affiliations, private foundations, any entity in the 26 U.S.C. §501(c) (hereinafter "501c") taxable category within the IRS descriptions, or other similar types of entities. Also, the "Giving" or fee donated may be made as a gift that falls under the annual maximum allowable by the IRS to an individual, for example in 2010, that the giving would be $13,000 per year per person, although this Gift (or giving) would not be tax deductible to the user making the gift. The user may create rules in order to dynamically determine the giving event, giving amount, and how these amounts are distributed to charities. These rules may be selectively changed only by the user or by a person/agent authorized by the user. In one non-limiting embodiment, the rules may be managed on a social networking site and may be dynamic or static. These rules include, in some non-limiting examples, merchants relationships, time, season, holiday, geographic location, category of items purchased, frequency of purchases, amount, giving limits, affiliation of vendor, affiliation of service/goods purchased, sporting event, predefined affiliations set by user, special events, gambling or wagers, raffles, affiliation with entity, historical event, or social networking behavior. The rules may be accessed, managed, created through an Internet site, mobile platform, or direct communication with the company.

Thus, an object of the invention is to overcome the delineated drawbacks of previous inventions.

Another object of the invention is to provide dynamic rules for facilitating distribution to charities, or individuals that require assistance from the donor Another object of the invention is to dynamically select a percentage distribution through dynamic coupons determined at the merchant site.

Another object of the invention is for the user to set the loyalty terms with participating merchants and charities.

Another object of the invention is to allocate distribution through a point of sale device.

Another object of the invention is to allocate distribution through a user loyalty card associated with a Financial Institution.

Another object of the invention is to allocate distribution through a gift matching commitment from one or more other users or philanthropic organizations, where a celebrity and/or a philanthropic organization may provide a rule through which a user may donate based on one or more rules created by the user and the philanthropic organization.

Another object of the present invention is for a website or a social network to govern the method or system of distribution.

In a first non-limiting aspect of the invention, a method of donating to a third-party includes: receiving information regarding a purchase transaction at a merchant; accessing a user preference regarding a donation from a user device, where the user device is of or related to a user; dynamically determining a discount to be allocated to the purchase transaction; and donating a value of the discount to the third-party according to the user preference. The user device includes information for accessing the user preference of the user, where the user preference includes rules for allocating the discount to the third party.

In a second non-limiting embodiment of the invention, a method for making a donation to a third party includes: receiving information regarding a purchase transaction at a merchant; dynamically determining a percentage discount to be allocated to the purchase transaction; accessing the user preference from the user account; and transferring a monetary value of the percentage discount to the third-party according to the user preference. The user preference includes at least one of trigger rules for determining donation criteria or distribution rules for giving to charities based on rules for determining an allocating of a percentage discount to the third party.

In a third non-limiting embodiment of the invention, a method for making a donation to a third party includes at least the following: storing, via a storage device, a user preference regarding a third-party in a user account; receiving, via a receiver, information regarding a purchase transaction at a merchant using a card linked to a Financial Institution; dynamically selecting, via a user device, a percentage discount to be allocated to the purchase transaction; accessing, via a processor, the user preference from the user account; transferring, via a processor, a monetary value of the percentage discount to the third-party according to the user preference. The user preference includes rules such as trigger rules for determining when to give a donation and distribution rules for allowing the user to give to charities or individuals based on rules for allocating the percentage discount to the third party.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems and methods for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE INVENTION

Figure 1:
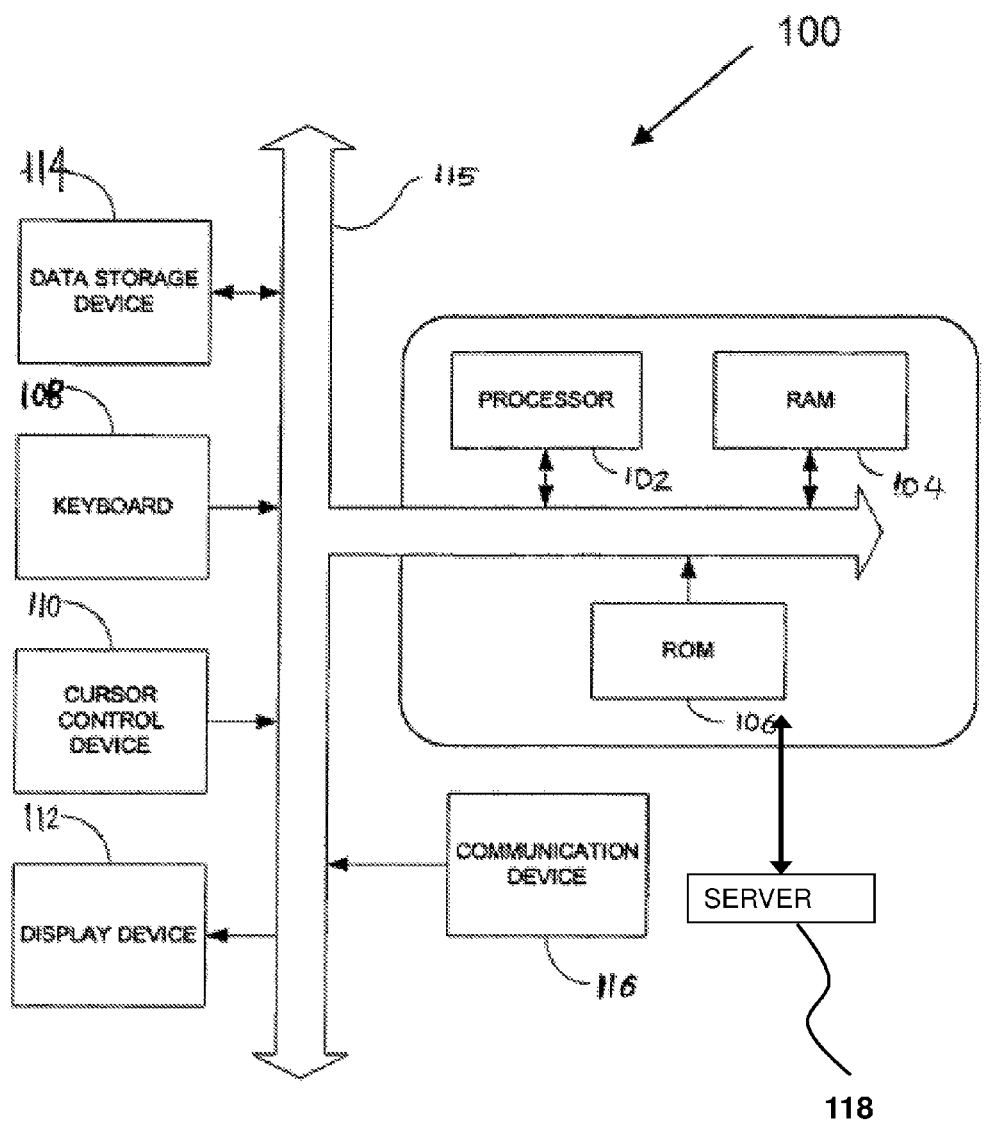
FIG. 1 illustrates a block diagram of an overall network system according to the preferred embodiment of the invention.

The present invention may be understood more readily by reference to the following detailed description of preferred embodiment of the invention. However, techniques, systems, and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. It must be noted that, as used in the specification and the appended claims, the singular forms "a", "an", and "the" include plural referents unless the context clearly indicates otherwise. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

The following definitions are given hereunder to better understand terms used in the specification:

"Merchants": Any individual, organization, or company that accepts payment for goods, services, or both.

"Customer" or "User": An individual, organization, or company that gives payment for goods, services or both; also an individual, organization, entity or company that has a relationship with merchant and may give payment or type of exchange for goods, services or both.

"Financial Institution": Any financial entity responsible for storing or facilitating the transfer of funds for goods, services, or both.

"Charity": Any individual, organization, company, place of worship, nonprofit, a 26 U.S.C. §501(c) (hereinafter "501c") tax entity, club, social community, environmental cause, scientific research, research endeavors, service provider, or individual(s) requiring support from the Customer.

"Dynamic coupon": An option of the customer to choose the discount amount within the parameters established by the customer or merchant and destination at point of sale.

"Rules": Merchant relationships, time, season, holiday, geographic location, category of items purchased, frequency of purchases, amount, giving limits, affiliation of vendor, affiliation of service/goods purchased, sporting event, predefined affiliations set by user, special events, gambling or wagers, raffles, affiliation with entity, historical event, or social networking behavior. The rules may accessed, managed, created through an Internet site, mobile platform, or direct communication with Company, research, entity, research endeavors, or service provider. The rules may be also be determined through the object of purchase, a vendor, or may include dynamic selection, by the user, of additional fees at the point of sale.

"Interact": To have a relationship based on the exchange of goods, services, currency, rewards, points, or donation.

"Point of sale": A physical location, computer terminal, internet based, mobile device, airwaves, gaming mechanism, signal, or other means of communication in which two parties have a transactions of goods and/or services.

"Distributes": To transmit monies, currency, rewards, points, funds, data, or labels.

"Rewards": A system to incentive an action or process with gifts of monetary value, points, ratio, rules, or partnerships with other merchants.

"Token": A means to interact via a device or apparatus including iPhone applications, Android applications, other smart phone applications, Facebook integration and applications, social networking applications, open authentication, credit processing systems, key fobs, paper, bar codes, image codes, biometric readers, text messaging, check in engines, online widgets, Google apps, Windows apps, HTML5, web browsers, QR codes (also called a matrix barcode or two-dimensional code), Universal Product Code (UPC), web links, magnetic stripes embedded in credit/debit cards, credit cards, debit cards, pre-paid cards, credits from third party, data marks, ASCII, text, unique alpha-numeric identification.

Referring initially to FIG. 1, there is shown a computer-based system including the various forms of hardware, software, firmware, special purpose processors, or a combination thereof for implementing the present invention. In one embodiment, the present invention may be implemented in software as an application program tangibly embodied on a program storage device. The application program may be uploaded to, and executed by, a machine comprising any suitable architecture such as a server 118. Preferably, the system 100 is implemented on a computer platform having hardware such as one or more central processing units (CPU) 102, a random access memory (RAM) 104, a read only memory (ROM) 106 and input/output (I/O) interface(s) such as a keyboard 108, cursor control device 110 (e.g., a mouse or joystick) and display device 112. A system bus 115 couples the various components and may be any of several types of bus structures including a memory bus or memory controller, a peripheral bus, and a local bus using any of a variety of bus architectures. The computer platform also includes an operating system and microinstruction code. The various processes and functions described herein may be either part of the microinstruction code or part of the application program (or a combination thereof) which is executed via the operating system.

In addition, various other peripheral devices may be connected to the computer platform by various interfaces and bus structures, such as a parallel port, firewire (IEEE 1394) serial port, or universal serial bus (USB). One such peripheral device may include a communications device 116, e.g., a modem, network interface card (NIC), satellite relay, wireless connection, etc., for enabling communications from the server of the loyalty program provider to various clients, e.g., merchant, customer and charity, for accessing sales data, financial information, or any other information. Other peripheral devices may include additional storage devices 114 and a printer. It is to be further understood that, because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

The server 118 may operate in a networked environment using logical connections to one or more remote computers. The remote computer(s) may be a personal computer, a server, a router, a network PC, a peer device or other common network node, and typically includes many or all of the elements described above relative to the server 118. It is to be appreciated that the network may be a local area network (LAN), wide area network (WAN), the Internet, or any known network that couples a plurality of computers to enable various modes of communication via network messages. Furthermore, the server 118 will communicate using the various known protocols such as Transmission Control Protocol/Internet Protocol (TCP/IP), File Transfer Protocol (FTP), Hypertext Transfer Protocol (HTTP), etc. and secure protocols such as Internet Protocol Security Protocol (IPSec), Point-to-Point Tunneling Protocol (PPTP), Secure Sockets Layer (SSL) Protocol, etc. The server 118 will further include a storage medium for storing a database of user accounts.

Figure 2:
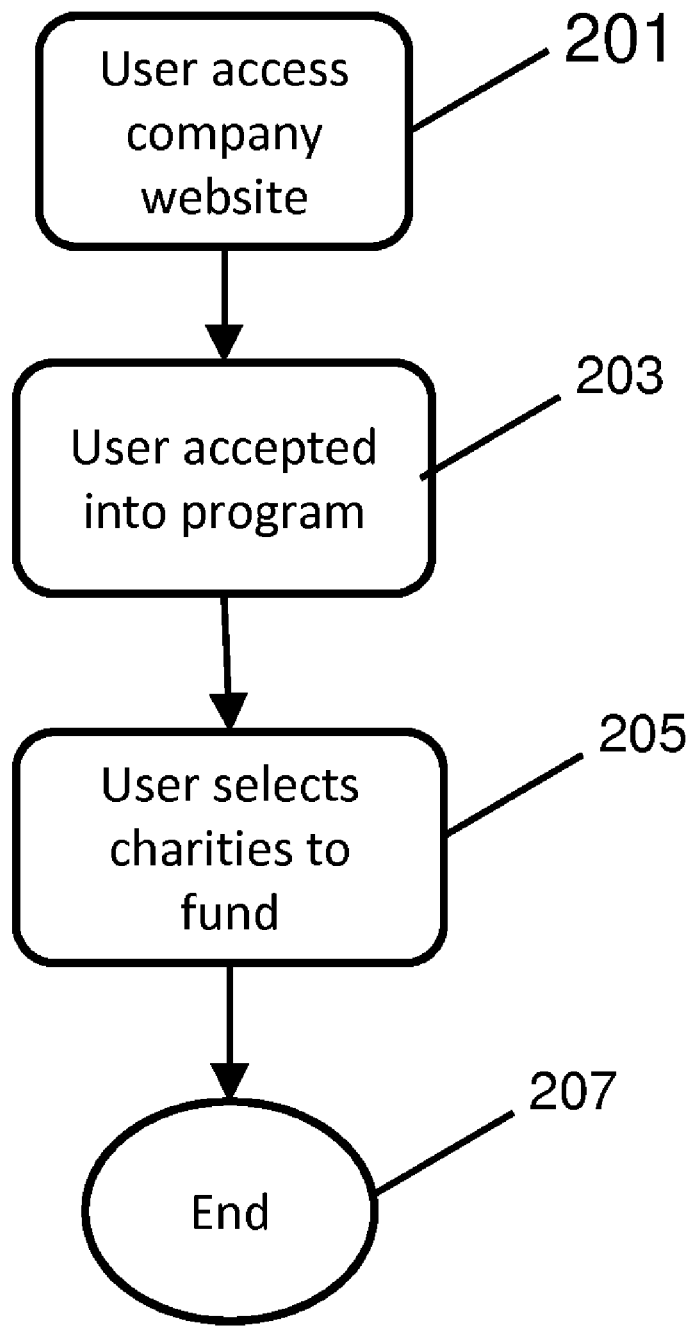
FIG. 2 is a process diagram for an enrollment process according to an embodiment of the invention.

Referring next to FIG. 2, there is shown a schematic diagram for an enrollment (sign-up) process for a User according to an embodiment of the invention. As shown, the process begins in step 201, where a User or Customer who wants to enroll in the loyalty program would access a website for a Company that is a provider of the loyalty program in order to transmit information needed to enroll into the loyalty program and sign up for a token. This information may be stored at any designated located by the Company. The Company may be independent of the merchant or the financial institution and provides the loyalty program for making distributions to the charity based on user preferences stored therein. The token may be a user device, a social network application, or other application for providing the User the ability to interact with a Merchant. The token also includes the User's financial information located at a Financial Institution, where the financial information determines the account from which funds for paying the merchant and the charity will come. Next, in step 203, the Company accesses the enrollment information of the User and utilizes this information to communicate with Financial Institution in order to retrieve financial information in order to complete the registration process. Upon completion of the registration process, the user is accepted into the loyalty program and is assigned a user account. The User may at this point create his donation preferences through rules for distribution of monetary amounts. The rules may include trigger rules, which include criteria as to when to give, and how much to give, and distribution rules, which include criteria that allow the User to give to charities based on the distribution rules. In one non-limiting embodiment, the distribution rules may fund charities that are not selected by the User but may be determined based on a formula defined in the rules. The Company may also receive rules by accessing the user's social networking site, where the social networking site provides a way to follow the User and view the giving rules created by the User. Additional rules may include giving based on the following criteria: determining the amount and time the charge will occur; dynamic or static rules; location, currency systems (such as banks, credit card, virtual currency, or similar types of currency systems.), and numerous third-party data, such as sports, weather, stocks, billboard top 10, etc can trigger the transactions to user; holding prepaid money as a group or "pot", and to hold money in between the trigger rule and the distribution rule. Next, in step 205, the User may identify the charities to fund. Once the User is registered in the system, the User may revisit the account to select multiple charities dynamically and as often as the User wants. It should be appreciated that the User provides customizable rules to a loyalty program based on several criteria. It should also be appreciated that the User may elect to add additional fees collected from the Financial Institution based on predefined rules set forth and authorized.

Preferably, the User would receive a credit card from Financial Institution as part of the sign up process with the Company. However, in another non-limiting embodiment, a gift card may also be obtained for the loyalty program. During registration, the User may use the rules to designate how the monies would be distributed. At the point of sale, the User makes the purchase at a venue whether online, mobile or other physical point of sale location. The User may also add additional funds to the purchase at the point of sale based on the predefined rules stored in the system. When that data is received by the Company, they impose these rules set in place by the User upon receiving related to a transaction completed by User at a merchant. Upon receiving the funds from Financial Institution, a check would be sent to the charity for a certain period, such as monthly, quarterly, or any other period defined by the loyalty program. A percentage of total sale or set fee would be retained to the company for its compensation of activities.

Figure 3:
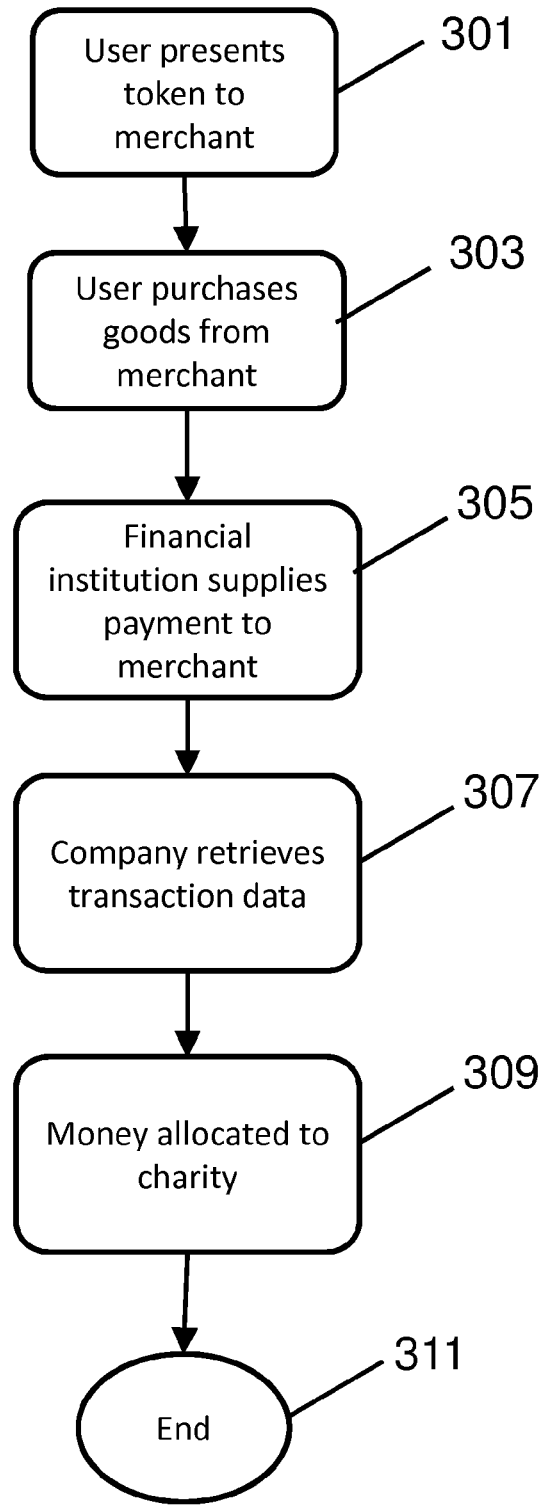
FIG. 3 is a process diagram showing a transaction process according to an embodiment of the invention.

In an alternate embodiment as show in FIG. 3, there is shown a process diagram for a transaction initiated by the User utilizing a token. The process starts in step 301, where a User (or customer) may present their token to the merchant for purchase of goods or services at the point of sale. The token is a means to interact via a device or apparatus including iPhone applications, Android applications, other smart phone applications, Facebook integration and applications, social networking applications, open authentication, credit processing systems, key fobs, paper, bar codes, image codes, biometric readers, text messaging, check in engines, online widgets, Google apps, Windows apps, HTML5, web browsers, QR codes (also called a matrix barcode or two-dimensional code), Universal Product Code (UPC), web links, magnetic stripes embedded in credit/debit cards, credit cards, debit cards, pre-paid cards, credits from third party, data marks, ASCII, text, unique alpha-numeric identification. The User would elect to determine the discount amount, if negotiated with the merchant, and performs the sale transaction with the merchant. In step 303, the User would buy goods or services from the merchant, and the merchant would report the sale transaction details to the Financial Institution. In step 305, the Financial Institution would supply the necessary credit payment to the merchant, while retaining any data associated with the sale transaction. Next, in step 307, the Company that administers the loyalty program accesses the transaction data from the Financial Institution associated with the user sale transaction, and applies the user-created rules. This transaction information is analyzed and screened through the rules set by the user. If the User had selected additional funds to pay the charity designated, the Company would then bill the User for any additional amounts that the User designated via the rules. Data related to the amount billed to the User via the Financial Institution would be retained in the Company database for delivery to the charity. In step 309, depending on these rules as applied to transaction data and charity selections, the donations are allocated to certain charities by the Company. In an alternate embodiment, the donations may be allocated to the User in the event the User is responsible for selecting the charity and transmitting the donation from the User. In this case, the Company follows the Users wishes. Reports on the giving transactions and relationships are sent to User. Reports and monies are distributed to the charity or multiple eligible charities that were designated by the user as defined in the rules. The process ends in step 311. It should be appreciated that Financial Institution may perform the steps implemented by third party or company, thereby eliminating the need for company to manage the program.

Figure 4:
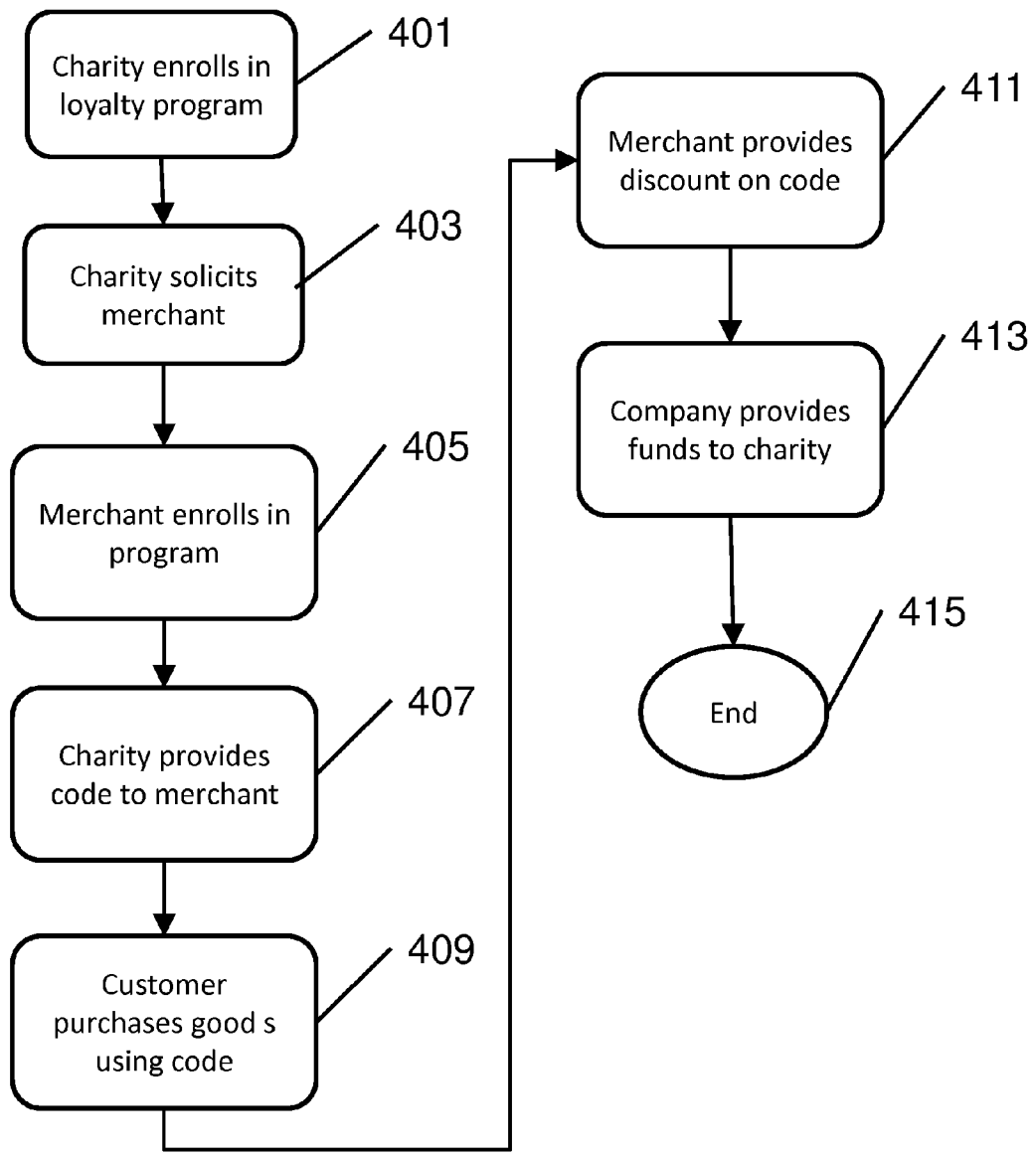
FIG. 4 is a process diagram showing a transaction process according to an alternate embodiment of the invention.

FIG. 4 shows process diagram for an enrollment and transaction process according to an alternate embodiment of the invention. As shown, the process begins in step 401 where a loyalty program administered by Company provides a website so that charities may sign up for an account. The Company may be independent of the merchant or the financial institution and provides the loyalty program for making distributions to the charity based on user preferences stored therein. The charity may print their unique discount code, image, see usage stats, and monies contributed. Next, in step 403, the charity would solicit local vendors and merchants to encourage them to sign up to the loyalty program. Next, in step 405, these merchants go online or within a third party application to sign up to the loyalty program on the Company website. In step 407, enrolled merchants would be issued a code to use during a transaction in order to support giving to the charity. In this manner, a relationship is created between the Company and Merchants and between the Company and charities. The Customer would participate with the Charity of its choosing and would support that Charity through the Merchant of its choosing. The Customer would control the program through many parties over a period the Customer chose. The merchant is enrolled in the loyalty program upon agreeing to give a percentage of sales, or fee, to a charity or multiple charities as well as agreeing to give a percentage of sales, or fee, to the company. Alternatively, merchants would be given an option to give a percentage of sales, or fee to the customer at the point of sale. Next, in step 409, a customer would initiate the distribution phase by purchasing goods or services from the merchant. The merchant would utilize the code during a point of sale transaction. Next, in step 411, the merchant would scan the code using a smart phone or other device, and provide the discount code to the customer during the transaction between Merchant and the customer. The customer may provide the discount to the charity through customer defined rules previously created by the customer. Next, in step 413, the sales information is calculated by the company to give either a percentage or fee to the company and the charity. The process ends in step 415. In an alternate embodiment, an HTML5 mobile web page can read a QR code or bar code. The merchant would use a smart phone or other device with camera or hardware that can read or scan the code. The code may also be provided through a magnetic stripe card, key fob, or mobile device, which would then be read with the appropriate device. The code would be validated at the merchant device and allow the merchant to enter in the sale amount. The sale transaction including merchant information, code, and total would be sent to company servers. At the point of sale, the merchant would give the customer their discount or alternatively provide the discount to the charity. The Company would charge the merchant for the percentage or fees due. Upon receiving the funds, a check would be made out to the customer to be given to the charity for that period list of transactions or a check may be sent directly to the charity on behalf of the customer. A percentage of total or fee would be retained to the company for costs associated with managing the loyalty program.

Thus, this invention is not limited to the disclosed features and other similar method and system may be utilized without departing from the spirit of the present invention. While the present invention has been described with reference to the preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A method, comprising:
   receiving, via a receiver, information regarding a donation transaction;
   accessing, via a processor, a user-created rule from a user device, wherein said user device of or related to a user includes information for accessing said user-created rule,
   the user-created rule is created in response to user entry of donation criteria regarding the recipient party in a social networking account associated with a user,
   the user-created rule is created by user entry of donation criteria regarding a recipient party,
   the user-created rule includes one or more rules for allocating an amount to the recipient party, and
   the user-created rule includes a trigger rule specifying donation criteria indicating conditions under which to allocate the amount to the recipient party based at least in part on third party event data for triggering the donation;
   determining, via said processor, the amount for transfer from the user to the recipient party by applying the user-created rule, wherein the amount is dynamically changed based on a formula in the rules; and
   donating, via said processor, the amount to said recipient-party according to said user-created rule.

2. The method of claim 1, wherein said rules are created over a social networking website.

3. The method of claim 1, wherein said user-created rule defines a time and the amount and define distribution criteria to at least said recipient-party.

4. The method of claim 1, wherein said user-created rule includes monetary information previously accumulated by said user.

5. The method of claim 1, wherein said donating comprises making a payment of a donation amount to said recipient-party on behalf of said user and charging the amount to said user account.

6. The method of claim 1, further comprising receiving said purchase transaction via a point of donation device executed by said user.

7. The method of claim 6, wherein said point of donation device is web based associated with said purchase transaction executed by said user.

8. The method of claim 6, wherein said point of donation device queries said user for at least one of a discount amount, additional amount, or variations of said discount amount to be donated.

9. The method of claim 1, wherein said recipient party is an organization defined by Internal Revenue Service code 501 (c), a fund, or an individual.

10. A method, comprising:
    storing, via a storage device, a user-created rule regarding a donation to a recipient-party, wherein
    the user-created rule is created in response to user entry of donation criteria regarding the recipient party in a social networking account associated with a user,
    the user-created rule includes one or more rules for allocating an amount to the recipient party, and
    the user-created rule includes a trigger rule specifying donation criteria indicating conditions under which to allocate the amount to the recipient party based at least in part on third party event data for triggering the donation;

accessing, via a processor, the user-created rule from the social networking account;

determining the amount to transfer from the user to the recipient party by applying the user-created rule, wherein the amount is dynamically changed based on a formula in the rules; and periodically transferring, via the processor, the amount to the recipient-party according to the user-created rule.

11. The method of claim 10, wherein the rules are created in a social networking web page.

12. The method of claim 10, wherein the rules define a time the amount and define distribution criteria to at least the recipient-party.

13. The method of claim 10, wherein the user-created rule includes monetary information previously accumulated by the user.

14. The method of claim 10, wherein transferring the amount to the recipient party as a donation to the recipient party comprises making a contribution to the recipient party on behalf of the user and charging the contribution to said user account.

15. The method of claim 14, further comprising initiating the donation via a point of donation device executed by the user associated with the user account.

16. The method of claim 15, wherein the point of donation device is web based associated with a purchase transaction executed by the user.

17. The method of claim 15, wherein said user enters an additional amount to be donated via the point of donation device.

18. The method of claim 10, wherein the recipient party is an organization defined by Internal Revenue Service code 501(c), a fund, or an individual.

* * * * *